(12) United States Patent
Page

(10) Patent No.: US 6,416,113 B1
(45) Date of Patent: Jul. 9, 2002

(54) APPLIQUE FOR VEHICLE B-PILLAR

(75) Inventor: Michael Page, Casco, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 0 days.

(21) Appl. No.: 09/657,166

(22) Filed: Sep. 7, 2000

(51) Int. Cl.$^7$ .............................. B60J 5/04; B60J 1/08; B62D 25/04
(52) U.S. Cl. .............................. 296/146.2; 296/146.1; 296/152; 296/146.5; 428/31; 49/502
(58) Field of Search ........................... 276/146.2, 146.1, 276/152, 146.5, 1.1; 428/31; 49/502; 293/128

(56) References Cited

U.S. PATENT DOCUMENTS

| | | | |
|---|---|---|---|
| 4,591,204 A | | 5/1986 | Gallitzendoerfer et al. |
| 4,736,981 A | | 4/1988 | Barton et al. |
| 4,838,004 A | * | 6/1989 | Adell .......................... 293/128 |
| 4,932,712 A | | 6/1990 | Tomforde |
| 4,969,295 A | * | 11/1990 | Nishikawa et al. ............ 49/502 |
| 5,092,078 A | | 3/1992 | Keys |
| 5,317,835 A | * | 6/1994 | Dupuy et al. .................. 49/502 |
| 5,433,498 A | * | 7/1995 | Ishiwata ...................... 296/39.1 |
| 5,451,090 A | * | 9/1995 | Brodie et al. ................ 296/201 |
| 5,647,631 A | * | 7/1997 | Lee ........................... 296/146.5 |
| 5,660,426 A | * | 8/1997 | Sugimori et al. ........... 296/39.1 |
| 5,702,148 A | | 12/1997 | Vaughan et al. |
| 5,791,716 A | * | 8/1998 | Takagi et al. ............... 296/39.1 |
| 5,833,303 A | * | 11/1998 | Kawai et al. ............... 296/39.1 |
| 5,947,547 A | * | 9/1999 | Deeks et al. .............. 296/146.7 |
| 5,968,614 A | | 10/1999 | Reichenberger et al. |
| 5,992,914 A | * | 11/1999 | Gotoh et al. ................ 296/39.1 |
| 6,015,182 A | * | 1/2000 | Weissert et al. .......... 296/146.5 |
| 6,032,982 A | | 3/2000 | Pakulsky et al. |
| 6,041,689 A | * | 3/2000 | Lair et al. .................... 296/204 |
| 6,095,593 A | * | 8/2000 | Johann et al. .............. 296/39.1 |
| 6,103,168 A | | 8/2000 | Kelly |

* cited by examiner

Primary Examiner—Joseph D. Pape
Assistant Examiner—Hilary Gutman
(74) Attorney, Agent, or Firm—Nixon & Vanderhye P.C.

(57) ABSTRACT

An applique for a pillar (e.g., B-pillar) of a vehicle is disclosed, wherein the applique is a decorative member which is fastened to a vehicle surface (e.g., to a door frame structure adjacent a pillar) in order to add styling and/or to functionally cover unsightly portions of the vehicle. In certain embodiments of this invention, the applique includes a glass receiving channel defined in a portion thereof, as well as a hook-shaped retainer member extending from one wall of the channel. Moreover, in certain embodiments, the applique includes a polymer based retainer member attached to a metal portion of the applique for the purpose(s) of: 1) insulating the metal portion of the applique from sheet metal of the door frame structure, 2) covering an end/edge of the metal portion of the applique so as to prevent damage to any component which should rub or bump up against it, and/or 3) fastening the applique to the door frame structure or pillar using at least one fastener integrally molded with the polymer based retainer member.

22 Claims, 7 Drawing Sheets

US 6,416,113 B1

APPLIQUE FOR VEHICLE B-PILLAR

This invention relates to an applique for a vehicle pillar or other suitable vehicle surface. In particular, certain embodiments of this invention relate to an applique (or over) for a vehicle pillar (e.g., B-pillar).

BACKGROUND OF THE INVENTION

An applique is a decorative member or cover which is fastened to a vehicle surface to add styling and/or to functionally cover aesthetically non-pleasing portions of the vehicle. Conventional appliques are made of metal and/or plastic as is known in the art. For example, it is known to provide appliques over the external surfaces of B-pillars of a vehicle (car, truck, van, or the like). While the applique may be attached directly to the B-pillar itself, it is also possible to attach a B-pillar applique to door sheet metal so that the applique is not directly attached to the pillar and instead opens and closes along with the door while the B-pillar remains fixed in place. A pillar is known in the art as a structural member provided to support the structure of a vehicle.

FIG. 1 illustrates a conventional automobile. The automobile of FIG. 1 includes front and rear assemblies 1 and 3 having front and rear windows 5 and 7, respectively. The vehicle B-pillar, generally designated by reference numeral 9, is located at least partially between the front and rear windows. Generally speaking, forward pillar 11 is typically referred to as an A-pillar, center pillar 9 as a B-pillar, and rear pillar 13 as a C-pillar.

Because of the high visibility of the B-pillar area, appliques are commonly used to provide an aesthetically pleasing surface on the pillar. Such an applique is used, for example, to cover manufacturing imperfections or the like and is commonly finished in cooperating or matching vehicle colors (black, red, blue, etc.) to provide a desirable aesthetic appearance.

FIG. 2 is a partial sectional view of a conventional B-pillar and corresponding applique which is illustrated and discussed in U.S. Pat. No. 5,092,078, the disclosure of which is hereby incorporated herein by reference. The assembly of FIG. 2 includes B-pillar 20, applique 21, extruded seal 22, and glass window 23. For purposes of example, it is noted that B-pillar 20 may separate the front door from the rear window in certain vehicles (e.g., in two door vehicles). Alternatively, the B-pillar 20 may separate the front window from the rear door in other types of vehicles (e.g., four door vehicles). In particular, B-pillar 20 includes inboard sheet 24 and outboard sheet 26. Formed metal flanges 24, 26 are welded together at areas 27.

Unfortunately, the assembly of FIG. 2 suffers from at least the following problems. First, the portion of the assembly that receives window glass 23 is overly complicated. The shape of the extrusion is undesirable, complicated, and/or burdensome. Second, portion 28 of metal applique 21 which wraps around an edge of pillar 20 (i.e., portion 28 is hook shaped) is undesirable because: a) it creates a metal surface which is exposed and can potentially damage items and/or components which hit it, and/or b) it creates a metal-to-metal contact between the edge of pillar 20 adjacent weld 27 and applique 21 which can lead to undesirable movement, scratching, etc.

FIGS. 3(a)–3(c) illustrate a conventional applique for a vehicle B-pillar that has been sold by the applicant. This B-pillar applique is attached to the door frame (not directly to the B-pillar) so that the applique opens and shut along with the door (e.g., front door) while the B-pillar remains fixed in place. It is currently believed that this applique represents "prior art" and therefor it is labeled as such. As can be seen, the applique of FIG. 3 includes both an overlying formed sheet metal portion 30 which is to be seen by a viewer, and an underlying polymeric portion 31 attached to portion 30. Plastic fasteners 32 are provided in order to help secure the applique to the B-pillar. While the applique of FIGS. 3(a)–3(c) has been successful in the field and is an overall good product, it has been found that there may be easier ways to attach an applique to a vehicle than those implemented by the applique of FIG. 3.

In view of the above, it will be apparent to those skilled in the art that there exists a need in the art for an improved design for an applique (e.g., B-pillar applique) for covering a pillar of a vehicle or any other suitable vehicle surface. It is a purpose of different embodiments of this invention to fulfill any and/or all of the aforesaid described needs in the art, and/or to solve any or all of the aforesaid problems or other problems which will become apparent to the skilled artisan when given the following disclosure.

SUMMARY OF THE INVENTION

An object of this invention is to provide an improved applique for at least partially covering a pillar (e.g., B-pillar) or other surface (e.g., door frame) of a vehicle (e.g., car, truck, van, etc.).

Another object of this invention is to provide an improved applique for a B-pillar of a vehicle.

Another object of this invention is to provide an applique which includes a window glass receiving channel integrally formed therein.

Another object of this invention is to provide a B-pillar applique which includes a molded polymer inclusive (e.g., entirely or partially of a polymer material) retainer member adhered or otherwise fastened thereto, the retainer member both 1) helping retain the applique on the door, and 2) providing a polymer inclusive insulation layer located between metal of the door frame and a metal or other exterior portion of the applique. Optionally, an end portion of the polymer inclusive retainer member may wrap partially or fully around an end of a metal portion of the applique in a hook-like manner in order to cover an exposed end/edge of the metal portion.

In certain embodiments of this invention, the B-pillar remains fixed in place as part of the vehicle while the B-pillar applique is attached to a door for opening and closing therewith. In other words, the B-pillar applique may not be directly connected to the B-pillar itself, but instead may be attached/connected to the door frame.

Yet another object of certain embodiments of this invention is to provide an applique (or cover) which includes an end portion which wraps around an end of a corresponding door frame flange in a hook-like manner in order to help retain the applique on the door frame.

Certain embodiments of this invention fulfills any and/or all of the aforesaid objects or needs by providing a vehicle B-pillar assembly comprising:

a B-pillar;

a door structure including first and second pieces of sheet metal which are connected to one another at a flange portion of the door structure;

an applique for attachment to the door structure;

wherein said applique includes a formed sheet metal member and a polymer inclusive retainer member, said polymer inclusive retainer member being attached to an interior surface of said sheet metal member; and wherein said polymer inclusive retainer member includes: a) at least one fastener which at least partially protrudes through an aperture in said door structure in order to help attach said applique to said door structure, and b) a hook-shaped portion which wraps at least partially around a first end of said sheet metal member in order to cover at least a portion of said first end of said sheet metal member, and wherein said hook-shaped portion is spaced from said fastener.

Certain other embodiments of this invention fulfill any and/or all of the above-listed needs or objects by providing an applique for attachment to a door structure of a vehicle, said applique comprising:

a body shaped so as to define a window receiving channel therein, said window receiving channel being defined by at least first and second approximately parallel walls of said body that are connected to one another via a base wall;

at least one fastener adapted to protrude at least partially through an aperture in the door structure in order to help attach the applique to the door structure; and a retainer portion at an end of said applique for wrapping around at least a portion of a flange of the door structure in order to help attach the applique to the door structure.

Yet other embodiments of this invention fulfill any and/or all of the above-listed needs or objects by providing an applique for attachment to a door structure of a vehicle, said applique comprising:

a structure shaped so as to define a window receiving channel therein, said window receiving channel being defined by at least first and second approximately parallel walls connected to one another via a base wall; and a polymer inclusive retainer member including (i) at least one fastener adapted to protrude at least partially through an aperture in the door structure in order to help attach the applique to the door structure, and (ii) a seal portion including a flexible lip adapted to provide a seal against an adjacent applique provided on another door frame structure.

This invention will now be described with respect to certain embodiments thereof, along with reference to the accompanying illustrations.

DETAIL DESCRIPTION OF CERTAIN EMBODIMENT OF THIS INVENTION

Figure 1:
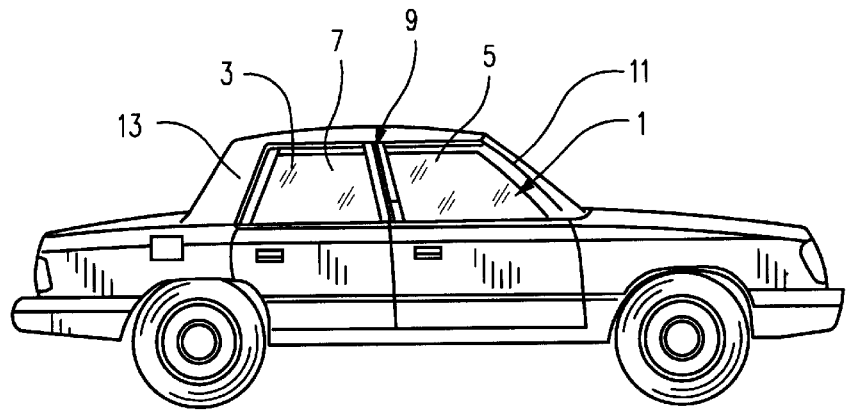
FIG. 1 is a side plan view of a conventional automobile.
Figure 2:
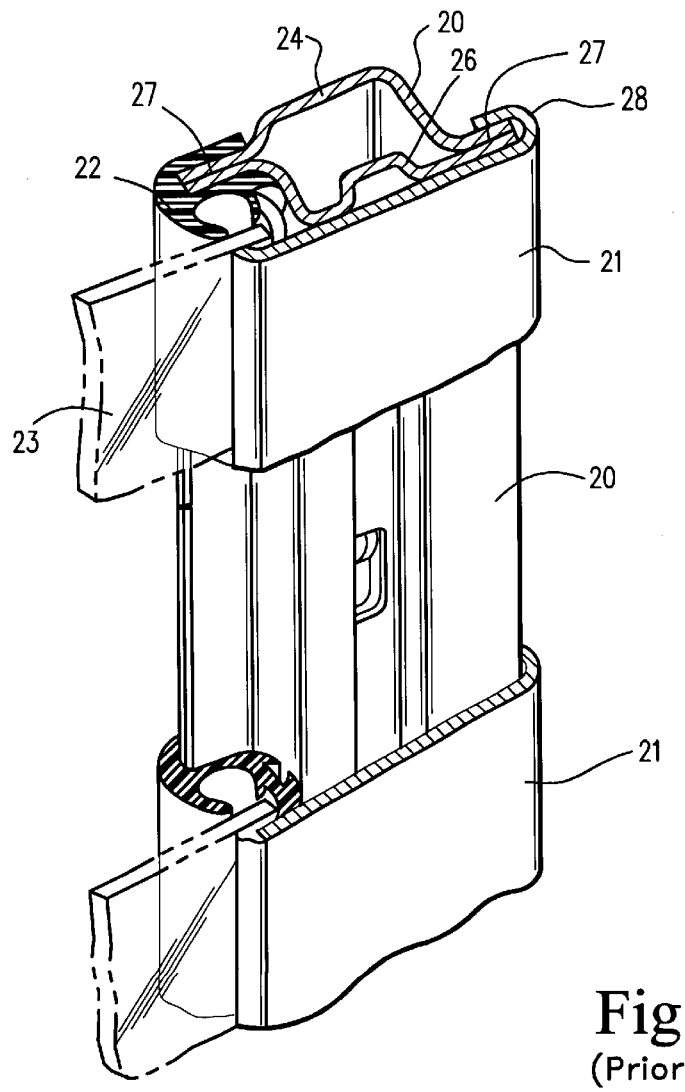
FIG. 2 is a partial perspective and partial sectional view of a conventional assembly including a B-pillar, applique, and window.
Figure 3A:
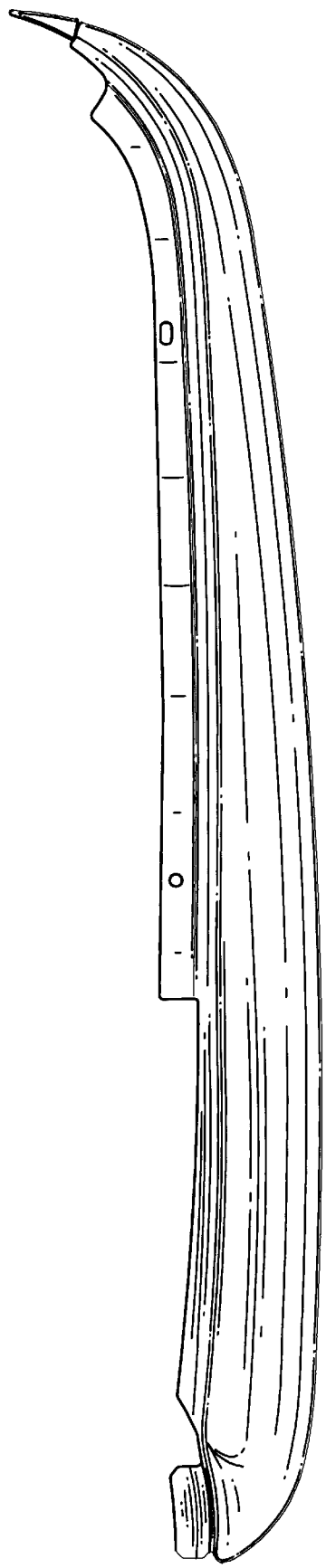
FIG. 3(a) is a side plan view of a conventional applique for a vehicle B-pillar which illustrates the exterior surface of the applique (i.e., the side seen by one viewing the vehicle to which the applique is attached).
Figure 3B:
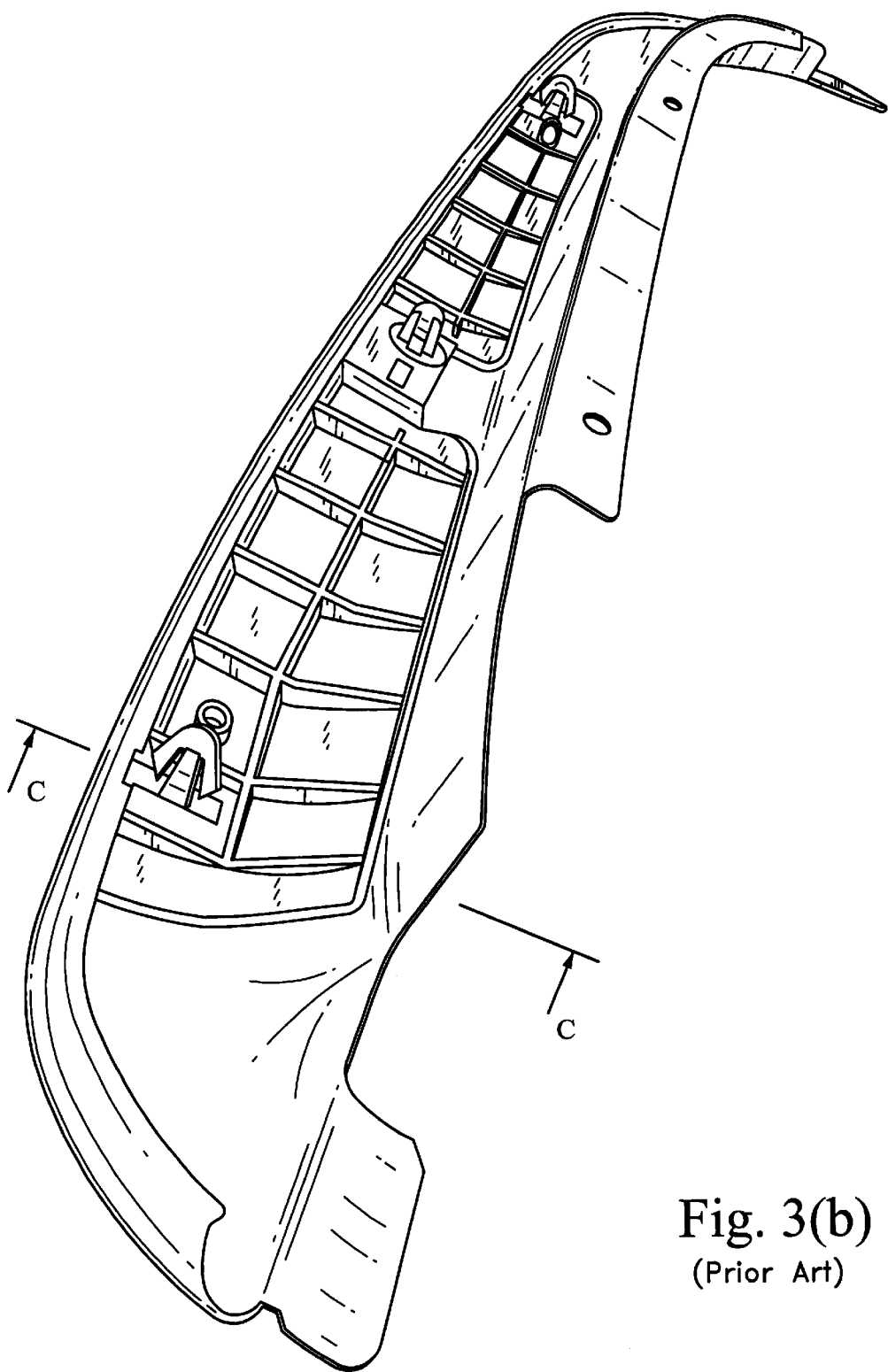
FIG. 3(b) is a perspective view illustrating the underneath side of the applique of FIG. 3(a).
Figure 3C:
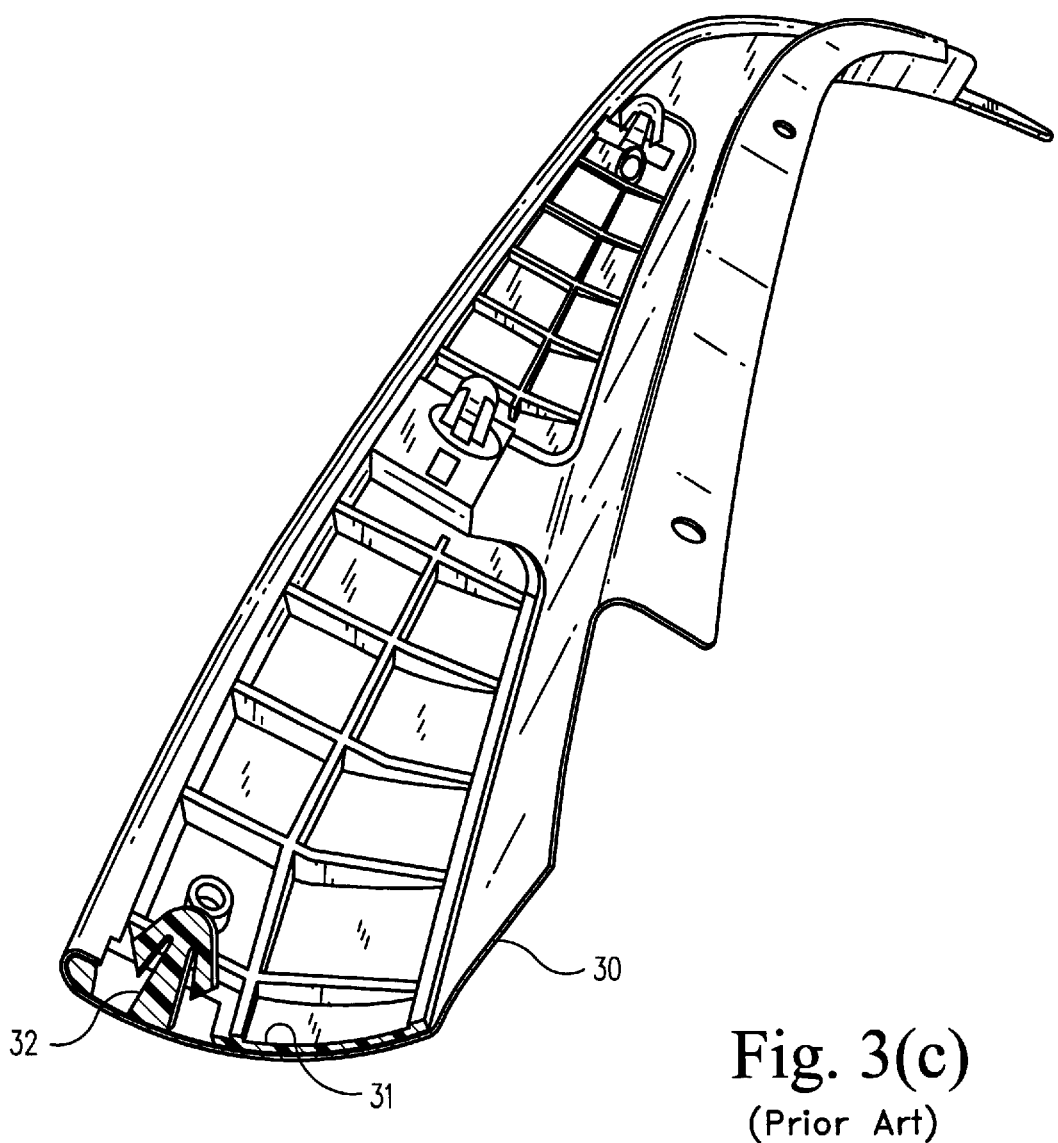
FIG. 3(c) is a partial cross sectional view illustrating the applique of FIGS. 3(a)–(b) along section line C—C, illustrating a cross section of a plastic or polymeric fastener of the applique.

Referring now more particularly to the accompanying drawings in which like reference numerals indicate like parts throughout the several views.

Figure 4:
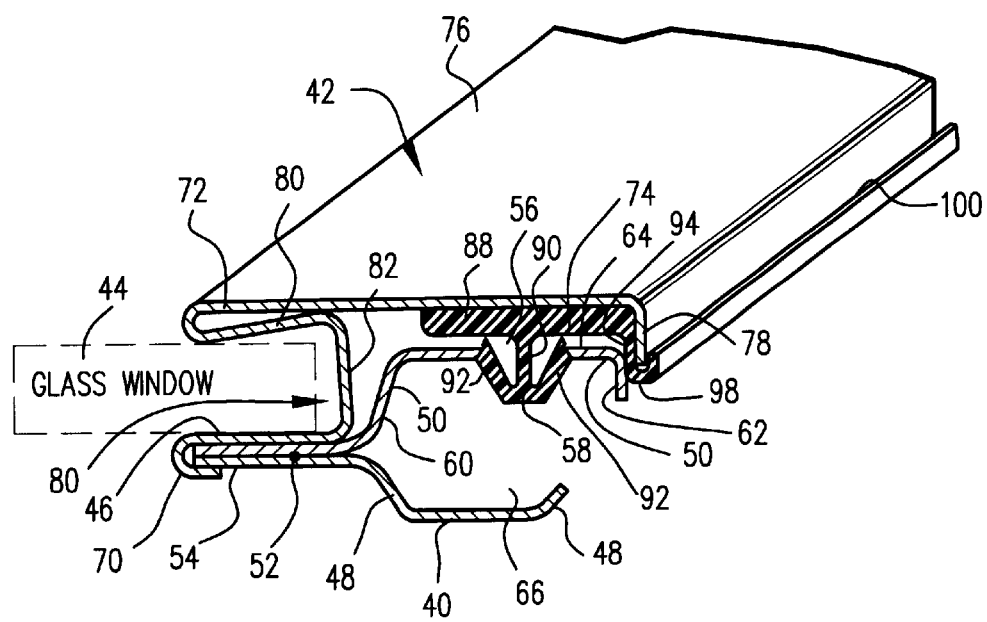
FIG. 4 is a sectional view of a B-pillar applique assembly according to an embodiment of this invention (i.e., viewed sectionally from the top in the case of a door on the passenger side of the vehicle).

FIG. 4 is a sectional view of a B-pillar assembly according to an embodiment of this invention. The assembly includes door frame 40, applique 42 which is fastened/attached to sheet metal of the door frame 40, and glass window 44 which is received within glass window channel 46 formed in the applique 42. Applique 42 is attached to the exterior or outboard side of door frame 40, and the applique includes both polymer inclusive retainer member 74 and three-dimensionally formed sheet metal member 72.

Figure 9:
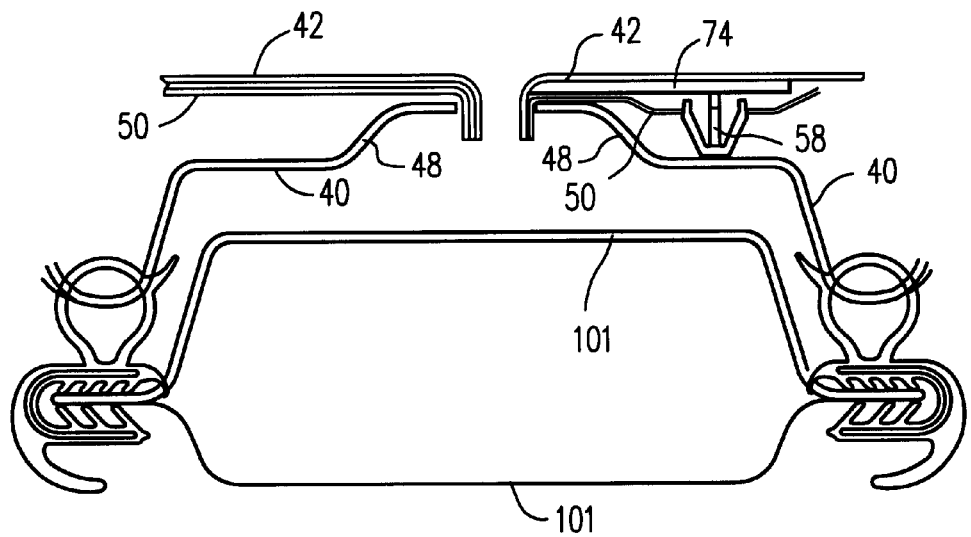
FIG. 9 is a sectional view illustrating a B-pillar assembly where B-pillar appliques are attached to respective door frames which open/close relative to the fixed B-pillar.

The term pillar herein refers to any structural member of a vehicle, including but not limited to A-pillars, B-pillars, C-pillars, or any other types of vehicle pillars. Pillars are typically fixed to a vehicle and do not open or shut along with a door (e.g., see FIG. 9). Meanwhile, B-pillar appliques herein are preferably attached to corresponding door frames (for front or rear doors) so as to open and/or close therewith relative to the fixed B-pillar. FIG. 9 is a sectional view illustrating the relationship between fixed B-pillar 101, front and rear door frames 40, and B-pillar appliques 42 which are connected to the door frames 40 to open/close along with the doors themselves while the pillar 101 remains fixed in place.

Referring to FIGS. 4 and 9, door frame 40 includes first and second metal sheets 48 and 50, respectively, which are welded to one another at 52. Inner door frame sheet 48 and outer door frame sheet 50 are formed as illustrated in FIG. 4 so as to create door frame flange portion 54 where the two sheets are welded together. At least one (and preferably a plurality) of apertures or holes 56 are formed in outer or outboard door frame sheet 50 in order to receive fastener or retainer members 58 therein, in order to help fasten and/or secure applique 42 to door frame 40. In outer sheet 50, bend 60 and the flat portion helping make up flange portion 54 are formed on one side of apertures 56, while angled portion 62 is formed on the other side of apertures 56. Angled portion 62 of sheet 50 forms an angle of approximately 90 degrees (i.e., 90 degrees plus/minus 15 degrees in either direction) with a relatively planar portion 64 of sheet 50 which is located proximate and adjacent apertures 56. It is noted that cavity or hollow area 66 is provided between door frame sheets 48 and 50 in the area proximate apertures 56 in order to provide structural strength and to permit a portion of fastener(s) 58 to protrude through aperture(s) 56 in order to enable a secure fastening system for securing the applique 42 to the door frame 40. It is noted that appliques 42 herein may be attached to either front or rear door structures in different embodiments.

Applique 42 is fastened to door frame 40 via at least one fastener 58 (e.g., W-based clip 58 as illustrated) and hook shaped retainer end portion 70 which wraps around an end of door frame flange portion 54. Applique 42 includes both base 72 (e.g., of sheet metal) and polymer inclusive retainer member 74 which is adhered or otherwise fastened/connected to base 72. Base sheet metal member 72 includes approximately planar or flat face 76, angled portion 78 which forms an angle of approximately 90 degrees with face 76, approximately U-shaped channel 46 for receiving glass window 44, and hook-shaped retainer end portion 70 for wrapping around an end of flange portion 54 in order to help secure applique 42 to door frame 40. Window receiving channel 46 is defined by a pair of approximately parallel walls 80 of the applique which are connected by base wall 82. Hook shaped retainer member/portion 70 of the applique extends from an outer end of the applique wall 80 which is most closely adjacent to door frame (or door sheet metal) flange portion 54.

Polymer inclusive retainer and/or isolating member 74 may be attached to the interior surface of sheet metal face 76 by way of adhesive, plastic heat staking, or any other suitable means. Retainer member 74 includes base portion 88, neck 90 which extends inwardly from base portion 88 at an angle of approximately 90 degrees, fastener 58 including at least one tong 92 extending from neck 90, angled portion 94 which extends inwardly from an end of base portion 88 at an angle of approximately 90 degrees, and hook-shaped protective/isolation portion 98 which extends from an end of angled portion 94 and wraps around an end of the sheet metal of applique angled portion 78. Angled portion 94 and/or isolation portion 98 of the polymer inclusive retainer member 74 are located between the metal of door frame metal sheet 50 and the metal of applique base 72 so as to prevent the two metal surfaces from rubbing against each other during vehicle operation and/or installation. Moreover, the hook-shaped isolation portion 98 of member 74 covers up the potentially sharp metal edge of angled portion 78 in order to help prevent damage to any component which may rub against or otherwise come into contact with that portion of the applique. Thus, the wall making up angled portion 94 of member 74 is approximately parallel to the end wall 100 of hook shaped isolation portion 98 of member 74, with these two portions defining a channel therebetween which receives angled portion 78 of sheet metal base 72.

The assembly of FIGS. 4 and 9 is constructed and/or attached as follows. A vehicle pillar 101 (e.g., fixed B-pillar) is provided. Referring specifically to FIG. 4, at least one door frame 40 including door frame sheets 48, 50 (e.g., preferably of sheet metal) are provided as illustrated. A piece of sheet metal is cut and formed into what is to become the sheet metal 70, 72, 78, 80, 82 of the applique, in the shape illustrated in FIG. 4. Polymer inclusive retainer member 74 is separately molded (e.g., via injection molding, or alternatively via extrusion) and is attached to the interior surface of base 72 and/or portion 78 as illustrated in FIG. 4. In certain exemplary embodiments of this invention, member 74 may be made of or include any polymer inclusive or based material such as nylon, acetal, polycarbonate or the like. Applique 42 is complete once retainer member 74 has been attached to base 72 as illustrated in FIG. 4. Thereafter, the applique may be shipped to an automotive manufacturing facility wherein it is to be attached to the door frame 40 (or any other suitable door frame, pillar or surface) of the vehicle (e.g., on the vehicle assembly line) in order to cover up at least a portion of a pillar area (e.g., B-pillar area).

To attach applique 42 to door frame 40, hook-shaped retainer portion 70 of the applique is positioned around the end/edge of door frame flange portion 54. The main portion of the applique is pivoted about an axis located approximately at the end of flange portion 54 until one or more flexible fasteners or clip(s) 58 extend at least partially through corresponding aperture(s) 56 formed in door frame sheet 50 to location(s) sufficient to fasten the applique 42 to the door frame 40 as shown in FIG. 4. At this point, the protective angled portion 94 and/or hook-shaped protective portion 98 of polymer inclusive retainer member 74 is/are positioned in an insulating manner between the metal of angled portion 78 and the metal of sheet 50 so as to prevent the two metals from rubbing against one another.

It is emphasized that the shape of door frame 40 as shown in FIG. 4 is for purposes of example only and is not intended to be limiting. Door frames and other types of pillars which may be utilized in conjunction with this invention take many shapes, forms, and may be made of different materials. Moreover, hook-shaped portion 70 is optional and need not be provided in all embodiments. Also, other shaped retainer portions may be used at an end of wall 80 instead of the hook shaped portion 70 illustrated in the drawings. Moreover, in certain embodiments portion 98 is optional an need not be provided, as is channel 46.

Figure 5:
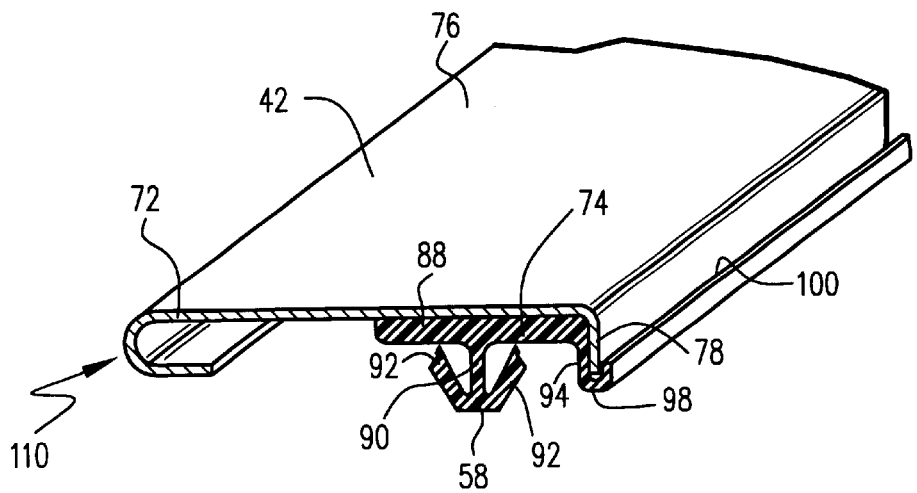
FIG. 5 is a sectional view of an applique according to another embodiment of this invention.

FIG. 5 illustrates a pillar applique 42 according to another embodiment of this invention. The FIG. 5 applique 42 differs from the applique of FIG. 4 primarily in that glass receiving channel 46 is not provided or defined by the applique itself. Instead, that end of the applique in FIG. 5 simply includes approximately hook-shaped retainer portion 110 which is provided for wrapping around an edge of a flange of a corresponding door frame or pillar.

Figure 6:
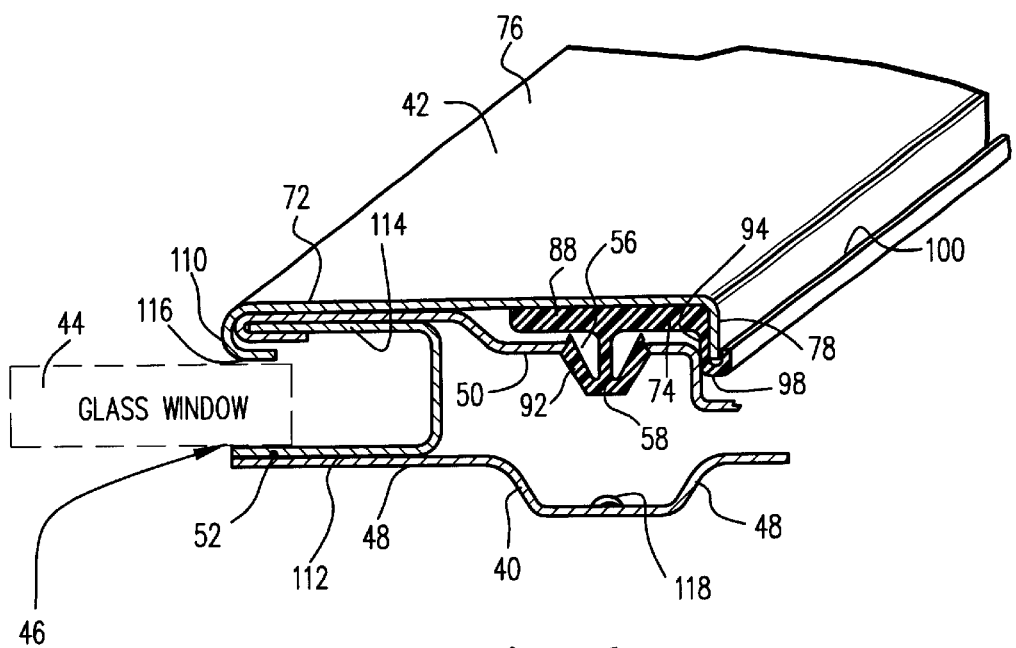
FIG. 6 is a sectional view of the applique of FIG. 5 attached to a door frame, viewed sectionally from the top in the case of a door or B-pillar on the passenger side of the vehicle.

FIG. 6 illustrates the applique 42 of FIG. 5 fastened to a corresponding door frame 40. As can be seen in the FIG. 5–6 embodiment, window receiving channel 46 is not defined primarily by a channel or recess formed in the applique. Instead, window receiving channel is defined by opposing flanges 112, 114 of the door frame itself, in combination with a hook-shaped end wall 116 of applique 42. Drill dimple(s) 118 may optionally be provided on a surface of sheet 48. Otherwise, this embodiment is similar to the FIG. 5 embodiment illustrated and discussed above.

Figure 7:
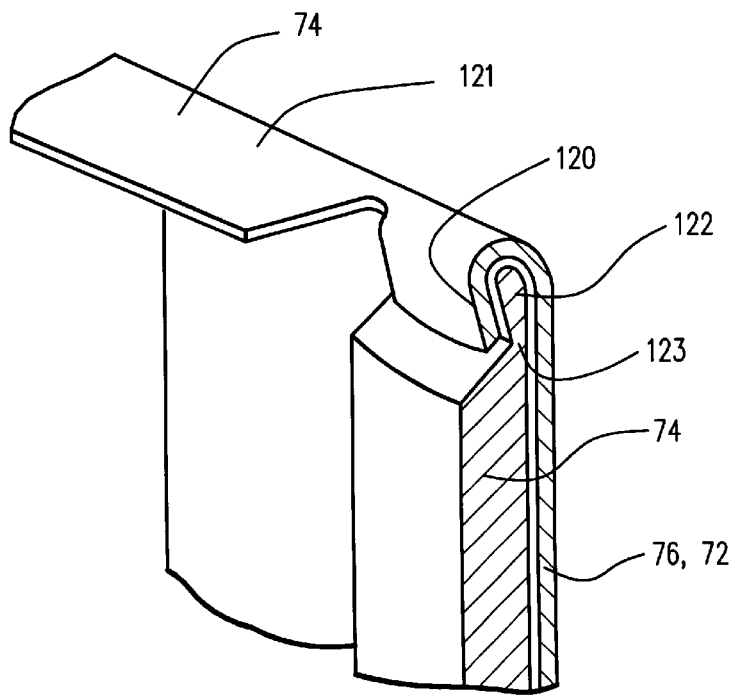
FIG. 7 is a perspective cut-away view illustrating how a turned down section of a door frame sheet metal end may hold the polymer inclusive retainer member in position thereon according to an exemplary embodiment of this invention.

Polymer based retainer member 74 may be attached/connected to metallic base 72 in any suitable manner. For example, member 74 may be attached to base 72 via adhesive, riveting, heat staking, or any other suitable means. For example and without limitation, FIG. 7 illustrates that a top portion of base 72 includes both a) hook-shaped wrap around metal retaining member 120, and b) angled portion 121 which forms an angle of approximately 90 degrees with base face 76. Retaining member 120 wraps around enlarged portion 122 of retainer member 74 and comes to rest against a thin neck 123 of member 74 in order to hold member 74 in place against the inner face of the base 72.

Figure 8:
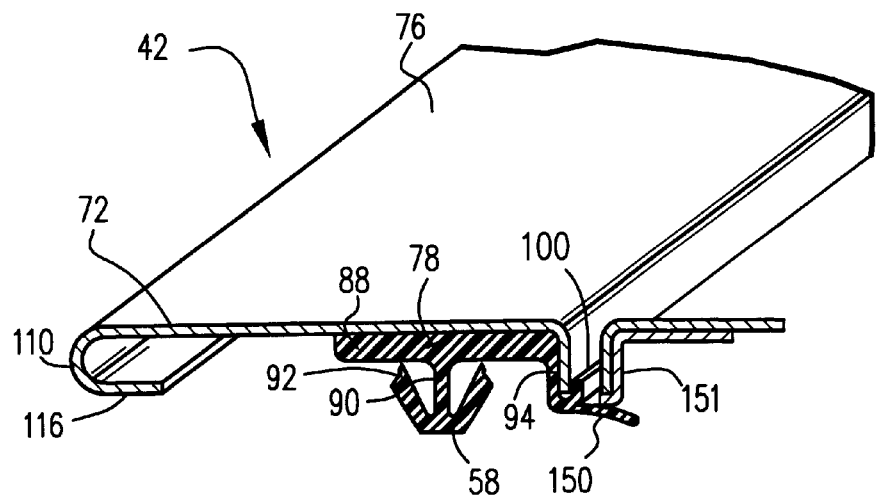
FIG. 8 is a sectional view of a B-pillar applique according to yet another embodiment of this invention, where the polymer inclusive retainer member includes a seal adapted to provide a visual and/or water seal against an adjacent structure.

FIG. 8 illustrates an applique 42 according to yet another embodiment of this invention. Applique 42 may be the same as any of the appliques 42 of FIGS. 4–7, except that an additional seal 150 is attached to or integrally formed with retainer member 74. Seal 150 is preferably a flexible lip which is biased up against a surface of an adjacent structure. For example, when applique 42 is attached to the rear door frame structure 40, then lip seal 150 may be biased up against a surface of the applique 151 (which may or may not be similar to an applique 42 herein) attached to the front door frame. Thus, a secondary weather seal 150 may be provided from the rear door applique to the front door applique and/or seal 150 may function to cover aesthetically non-pleasing color which could otherwise have been seen between the front and rear doors. In different embodiments of this invention, flexible lip seal 150 extends from at least one of angle portion 94 or hook-shaped protective portion 98 of polymer inclusive retainer member 74. Lip seal 150 may be insert molded over member 74 to result in the structure of FIG. 8, or alternatively may be integrally molded along with the rest of member 74. Lip seal 150 may of course be utilized in combination with any of the aforesaid embodiments (e.g., see any or all of FIGS. 4–7) herein.

What is claimed is:

1. A vehicle pillar assembly, comprising:
   a vehicle door structure including first and second pieces of sheet metal which are connected to one another at a flange portion of the door structure;
   an applique for attachment to the door structure;
   wherein said applique includes a formed sheet metal member and a polymer inclusive retainer member, said polymer inclusive retainer member being attached to an interior surface of said sheet metal member; and
   wherein said polymer inclusive retainer member includes: a) at least one fastener which at least partially protrudes through an aperture in said door structure in order to help attach said applique to said door structure, and b) a hook-shaped portion which wraps at least partially around a first end of said sheet metal member in order to cover at least a portion of said first end of said sheet metal member, and wherein said hook-shaped portion is spaced from said fastener.

2. The pillar assembly of claim 1, wherein said polymer inclusive retainer member further includes a base portion which extends in a direction approximately parallel to a face of said sheet metal member, and wherein said fastener protrudes at an angle of approximately 90 degrees from said base portion.

3. The pillar assembly of claim 2, wherein said polymer inclusive retainer member further includes an angled portion which extends between an end of said base portion and said hook-shaped portion.

4. The pillar assembly of claim 3, wherein said angled portion defines an angle of approximately 90 degrees with said base portion of said polymer inclusive retainer member.

5. The pillar assembly of claim 1, wherein said applique further includes a window receiving channel defined therein.

6. The pillar assembly of claim 5, wherein said sheet metal member of said applique further includes first and second approximately parallel spaced apart walls connected by a base wall for defining said window receiving channel.

7. The pillar assembly of claim 6, wherein said sheet metal member of said applique include a hook-shaped retainer member which wraps around at least a portion of an end of said flange portion of said door structure in order to help attach said applique to said door structure, said hook-shaped retainer member extending from said first wall defining said window receiving channel.

8. The pillar assembly of claim 7, wherein said sheet metal member of said applique further includes a second end, said first end of said sheet metal member being at least partially covered by said hook-shaped portion of said polymer inclusive retainer member, and said second end of said sheet metal member including said hook-shaped retainer member for wrapping around at least a portion of an end of said flange portion of said door structure.

9. The pillar assembly of claim 1, wherein said polymer inclusive retainer member further includes at least one flexible lip seal portion that provides a seal against another applique on an adjacent door frame structure.

10. The pillar assembly of claim 9, wherein said flexible lip seal portion is integrally molded with said polymer inclusive retainer member.

11. The pillar assembly of claim 1, wherein the pillar assembly comprises a B-pillar assembly.

12. An applique for attachment to a door structure of a vehicle, said applique comprising:
    a sheet metal member;
    a polymer inclusive retainer member including at least one fastener, said polymer inclusive retainer member attached to an inner surface of said sheet metal member; and
    said sheet metal member defining a window receiving channel including at least first and second spaced apart walls, and wherein a hook-shaped retainer member extends from at least one of said walls and is adapted to wrap at least partially around a flange or end of the door structure so that said applique is adapted to be attached to at least one of the door structure via at least said hook-shaped retainer member and said at least one fastener.

13. The applique of claim 12, wherein said polymer inclusive retainer member further includes a hook-shaped portion which wraps at least partially around a first end of said sheet metal member in order to cover at least a portion of said first end of said sheet metal member, and wherein said hook-shaped portion is spaced from said fastener and is adapted to be at least partially located between sheet metal of the door structure and said sheet metal member of said applique.

14. The applique of claim 12, wherein said polymer inclusive retainer member further includes a base portion which extends in a direction approximately parallel to a face of said sheet metal member, and wherein said fastener protrudes at an angle of approximately 90 degrees from said base portion.

15. The applique of claim 12, wherein said fastener includes a neck extending from said base portion and at least one flexible tong or tang angling away from an end of said neck.

16. The applique of claim 12, wherein said polymer inclusive retainer member is made of or includes nylon.

17. An applique for attachment to a vehicle door structure, the applique comprising:
    a) at least one fastener which is to at least partially protrude through an aperture in the vehicle door structure in order to help attach said applique to the door structure,
    b) a protective portion which wraps around a first end of a metal member of said applique in order to cover at least a portion of said first end,
    c) first and second walls at least partially defining a window receiving channel in said applique, and
    wherein said applique includes a polymer inclusive retainer member that is attached to said metal member, and wherein said fastener and said protective portion are integrally molded with said polymer inclusive retainer member.

18. The applique of claim 17, wherein said protective portion is hook-shaped.

19. The applique of claim 17, wherein said applique further includes a retainer portion at an end of said metal member for wrapping at least partially around an edge of the vehicle door structure in order to help attach the applique to the vehicle door structure.

20. An applique for attachment to a door structure of a vehicle, said applique comprising:

a body shaped so as to define a window receiving channel therein, said window receiving channel being defined by at least first and second approximately parallel walls of said body that are connected to one another via a base wall;

at least one fastener adapted to protrude at least partially through an aperture in the door structure in order to help attach the applique to the door structure;

a retainer portion at an end of said applique for wrapping around at least a portion of a flange of the door structure in order to help attach the applique to the door structure; and wherein the applique includes a formed sheet metal portion that includes said retainer portion and said first and second approximately parallel walls, and a polymer inclusive retainer portion that includes at least said fastener.

21. The applique of claim 20, wherein said polymer inclusive retainer portion further includes a flexible lip seal adapted to provide a seal from the applique to another applique on an adjacent door frame structure.

22. A vehicle applique for attachment to a vehicle and for receiving a door window, the applique comprising:

a formed sheet metal member and a polymer inclusive retainer member, said polymer inclusive retainer member being attached to an interior surface of said sheet metal member;

wherein the formed sheet metal member includes a channel defined therein for receiving an edge of the door window; and wherein said polymer inclusive retainer member includes: a) at least one fastener which at least partially protrudes through an aperture in a vehicle structure in order to help attach said applique to the vehicle, and b) a hook-shaped portion which wraps at least partially around a first end of said sheet metal member in order to cover at least a portion of said first end of said sheet metal member, and wherein said hook-shaped portion is spaced from said fastener.

* * * * *